Feb. 15, 1938.  B. STREZOFF  2,108,622
COLLAPSIBLE COAT HANGER
Filed March 10, 1936
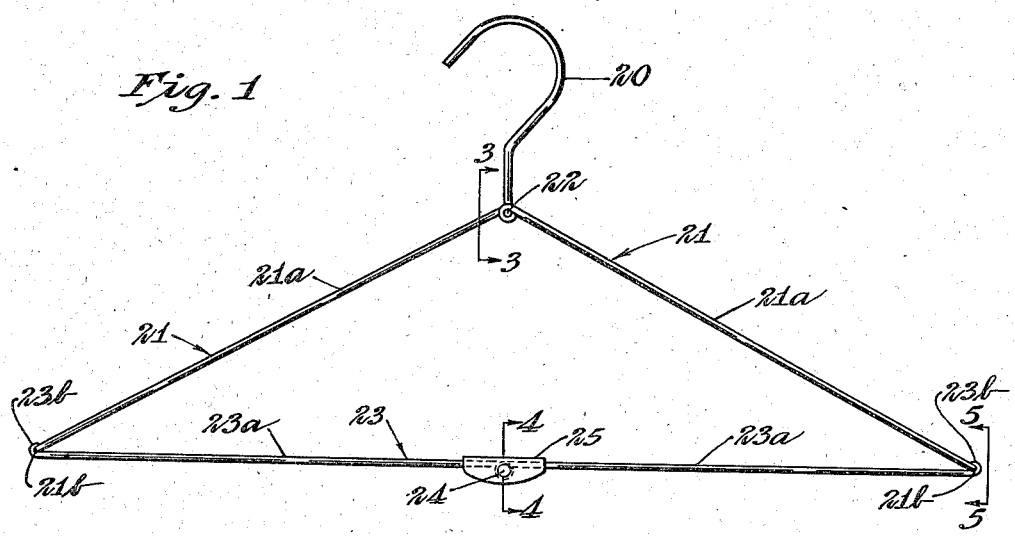
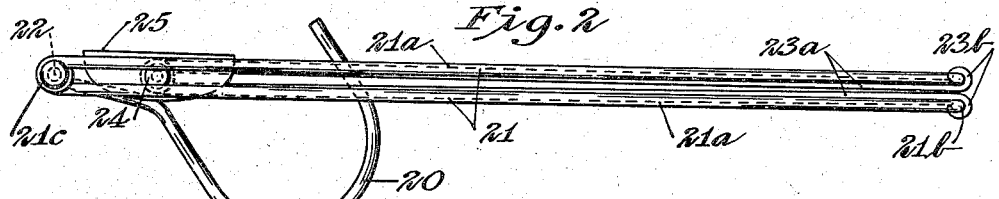
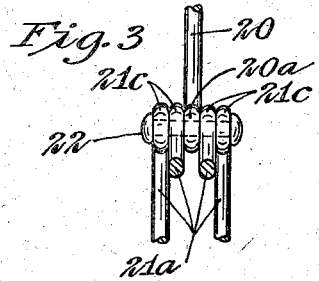
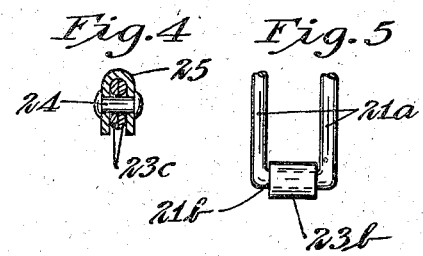
Inventor
Bogoia Strezoff
By Williamson & Williamson
Attorneys Patented Feb. 15, 1938

2,108,622

UNITED STATES PATENT OFFICE 2,108,622

COLLAPSIBLE COAT HANGER

Bogoia Strezoff, Minneapolis, Minn.

Application March 10, 1936, Serial No. 68,081

1 Claim. (Cl. 223—89)

My invention relates to coat hangers and particularly to collapsible coat hangers.

An object of my invention is to provide a novel, improved and rugged collapsible coat hanger comprising a strong and rigid structure when in operative position and being readily foldable into a very compact body.

This and other objects and advantages of the present invention will more fully appear from the following description, made in connection with the accompanying drawing, wherein like reference characters refer to the same parts throughout the various views, and in which, Fig. 1 is a front view of one form of my collapsible coat hanger when in operative position;

Fig. 2 is a side view of the coat hanger of Fig. 1 when in folded position;

Fig. 3 is a sectional view taken along the line 3—3 of Fig. 1, as indicated by the arrows;

Fig. 4 is a sectional view taken along the line 4—4 of Fig. 1, as indicated by the arrows;

Fig. 5 is a view taken along the line 5—5 of Fig. 1, as indicated by the arrows;

Referring to the drawing, Figs. 1, 2, 3, 4 and 5 show a form of my collapsible coat hanger built principally of material such as rod or wire and comprising a support engaging element, a pair of coat supporting arms and a brace constructed and arranged as described below.

The support engaging element may be of various forms but is preferably in the form of a hook 20 similar to hooks used on ordinary coat hangers except that the lower or free end of the shank thereof is formed into an eye 20a disposed in the same plane as the hook.

The coat supporting arms 21 are normally disposed in downwardly divergent relation to each other as shown in Fig. 1, but are swingably connected to each other at their upper ends to permit folding of the respective arms downwardly into close, substantially parallel relation to each other as shown in Fig. 2. Also, the hook 20 is swingably connected to the connected portions of the arms so that it can be swung downwardly into compact relation with the arms 21 as shown in Fig. 2.

Each of the arms 21 is constructed of wire bent into an elongated U-shape so as to provide a pair of parallel elongated side elements 21a with a relatively short connecting element 21b extending between the lower ends thereof in rigid integral relation therewith. The upper or free ends of the respective side elements 21a are formed into respective eyes 21c aligned with each other and disposed in respective planes normal to a plane containing both of the side elements 21a of an arm-forming pair thereof.

The eyes 21c of the two coat supporting arms 21 and the eye 20a of the hook 20 are all mounted on a pivot element such as the rivet 22 in rotatable relation thereto as shown in Fig. 3. Preferably the eye 20a of the hook 20 is placed on the medial portion of the rivet with the respective eyes 21c of one of the arms 21 disposed immediately outwardly thereof and the eyes 21c of the second arm disposed immediately outwardly of the eyes 21c of the first arm. The rivet 22 is headed at each end so as to retain the eyes 20a and 21c thereon.

To normally maintain the arms 21 in the divergent positions thereof shown in Fig. 1, a brace 23 is provided extending between and connected at its respective ends to corresponding points on the respective arms, these points preferably being at the lower ends of the arms. To permit folding of the arms 21 downwardly into compact relation the brace 23 is so constructed as to permit easy shifting of the same to render the same inoperative as a brace. The brace 23 is built to comprise two sections 23a, each section 23a being so connected at its outer end to one of the arms 21 as to permit vertical swinging of the section 23a relative to the arm 21 and the inner ends of the respective sections 23a being so connected together as to permit such swinging.

The outer end of each of the brace sections 23a is flattened and then bent around the connecting element 21b to form an eye 23b encircling the element 21b and forming therewith a pivotal joint. The inner ends of the respective brace sections 23a are formed into flat eyes 23c pivotally connected together by means of a pivot element such as the rivet 24. From the above it should be apparent that the brace 23 may be collapsed vertically away from the normal horizontally disposed position thereof shown in Fig. 1 wherein the respective brace sections are aligned in coaxial relation.

Means is provided to prevent the brace 23 from dropping appreciably below its normal position. For this purpose a somewhat elongated stop member 25 of inverted U-shape in cross-section is placed over the medial jointed portion of the brace 23 as shown in Figs. 1 and 4. The sides of the stop member 25 are apertured to receive the end portions of the rivet 24 which connects the respective brace sections 23a at their inner ends. The respective ends of the rivet 24 are headed to retain the eyes 23c and the stop member 25 on the rivet 24.

It is apparent that I have invented a novel, rugged, easily collapsible and distended collapsible coat hanger which comprises a strong and rigid structure when distended and is very compact when collapsed.

It will, of course, be understood that various changes may be made in the form, details, arrangement and proportions of the various parts without departing from the scope of the present invention.

What is claimed is:—

A folding coat hanger including a pair of normally downwardly divergent wire coat-supporting arms connected at their upper ends by a pivotal joint whereby said arms may be folded downwardly into compact, substantially parallel relation, a normally upwardly extending support-engaging element connected to said hanger in the vicinity of said pivotal joint, a toggle brace normally extending horizontally between said arms adjacent their lower ends to maintain said arms in divergent relation, said brace comprising two wire sections respectively pivotally connected at their outer ends to the respective arms, a pivot connecting together the inner ends of said respective sections to render said brace upwardly collapsible to permit compacting of said arms in close, substantially parallel relation with said sections, and a saddle clip overlying the pivotally connected inner ends of said wire toggle brace rods and having depending ears which confine the pivotally connected portions of said rod sections, said ears being connected with the respective ends of said pivot and the intermediate portion of said saddle clip having a longitudinal upper portion convex in cross section for abutting said pivotally connected inner ends of said rod sections when said brace is extended to horizontal position to positively restrain said toggle brace from downward collapsing.

BOGOIA STREZOFF.